US012562322B2

(12) United States Patent
Tannhäuser et al.

(10) Patent No.: US 12,562,322 B2
(45) Date of Patent: Feb. 24, 2026

(54) CIRCUIT BREAKER

(71) Applicant: Siemens Aktiengesellschaft, Munich (DE)

(72) Inventors: Marvin Tannhäuser, Hausen (DE); Manfred Heindl, Alteglofsheim (DE); Jörg Hussmann, Neumarkt (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 18/696,469

(22) PCT Filed: Sep. 5, 2022

(86) PCT No.: PCT/EP2022/074586
§ 371 (c)(1),
(2) Date: Mar. 28, 2024

(87) PCT Pub. No.: WO2023/052042
PCT Pub. Date: Apr. 6, 2023

(65) Prior Publication Data

US 2024/0404764 A1 Dec. 5, 2024

(30) Foreign Application Priority Data

Sep. 28, 2021 (DE) ..................... 10 2021 210 818.0

(51) Int. Cl.
*H01H 9/54* (2006.01)

(52) U.S. Cl.
CPC .................................. *H01H 9/547* (2013.01)

(58) Field of Classification Search
CPC ...... H01H 71/125; H01H 71/12; H01H 9/548; H01H 9/547
See application file for complete search history.

(56) References Cited

U.S. PATENT DOCUMENTS 7,633,022 B2 12/2009 Zöls
2009/0198459 A1* 8/2009 Bilac .......................... H02H 3/33 702/58

(Continued)

FOREIGN PATENT DOCUMENTS

DE 102019213604 A1 3/2021
EP 2448075 A1 5/2012

(Continued)

*Primary Examiner* — Rexford N Barnie
*Assistant Examiner* — Esayas G Yeshaw
(74) *Attorney, Agent, or Firm* — Laurence A. Greenberg; Werner H. Stemer; Ralph E. Locher

(57) ABSTRACT

A circuit breaker protecting an electric low-voltage circuit includes a housing with grid-side and load-side connections and a series circuit of a mechanical isolating contact unit on the grid side and an electronic interruption unit on the load side. The mechanical isolating contact unit has a handle opening and closing contacts. A current sensor unit is disposed in a conductor between the isolating contact unit and the interruption unit, for ascertaining a current level of the low-voltage circuit. A control unit is connected to the current sensor unit, electronic interruption unit, and mechanical isolating contact unit. When current and/or current/time thresholds are exceeded, prevention of a current flow in the low-voltage circuit is initiated. A power supply unit supplying energy to the circuit breaker is connected to conductors of the low-voltage circuit between the isolating contact unit and the interruption unit.

20 Claims, 1 Drawing Sheet

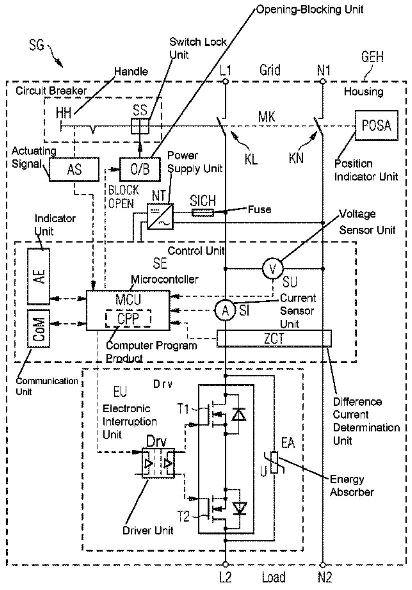

(56) References Cited

U.S. PATENT DOCUMENTS

| | | | | |
|---|---|---|---|---|
| 2017/0004948 | A1* | 1/2017 | Leyh | H01H 9/547 |
| 2020/0365346 | A1 | 11/2020 | Telefus et al. | |
| 2020/0366078 | A1* | 11/2020 | Telefus | H02H 3/044 |
| 2021/0066013 | A1 | 3/2021 | Kumer et al. | |
| 2022/0337046 | A1 | 10/2022 | Erven | |
| 2023/0198241 | A1 | 6/2023 | Tannhäuser | |
| 2025/0046537 | A1* | 2/2025 | Tannhäuser | H01H 71/12 |
| 2025/0149873 | A1* | 5/2025 | Bai | H01H 9/547 |

FOREIGN PATENT DOCUMENTS

| | | | |
|---|---|---|---|
| EP | 4091184 | A1 | 11/2022 |
| JP | 2021034124 | A | 3/2021 |
| WO | WO 2006119906 | A1 | 11/2006 |
| WO | 2015086437 | A1 | 6/2015 |
| WO | 2022243419 | A1 | 11/2022 |

* cited by examiner

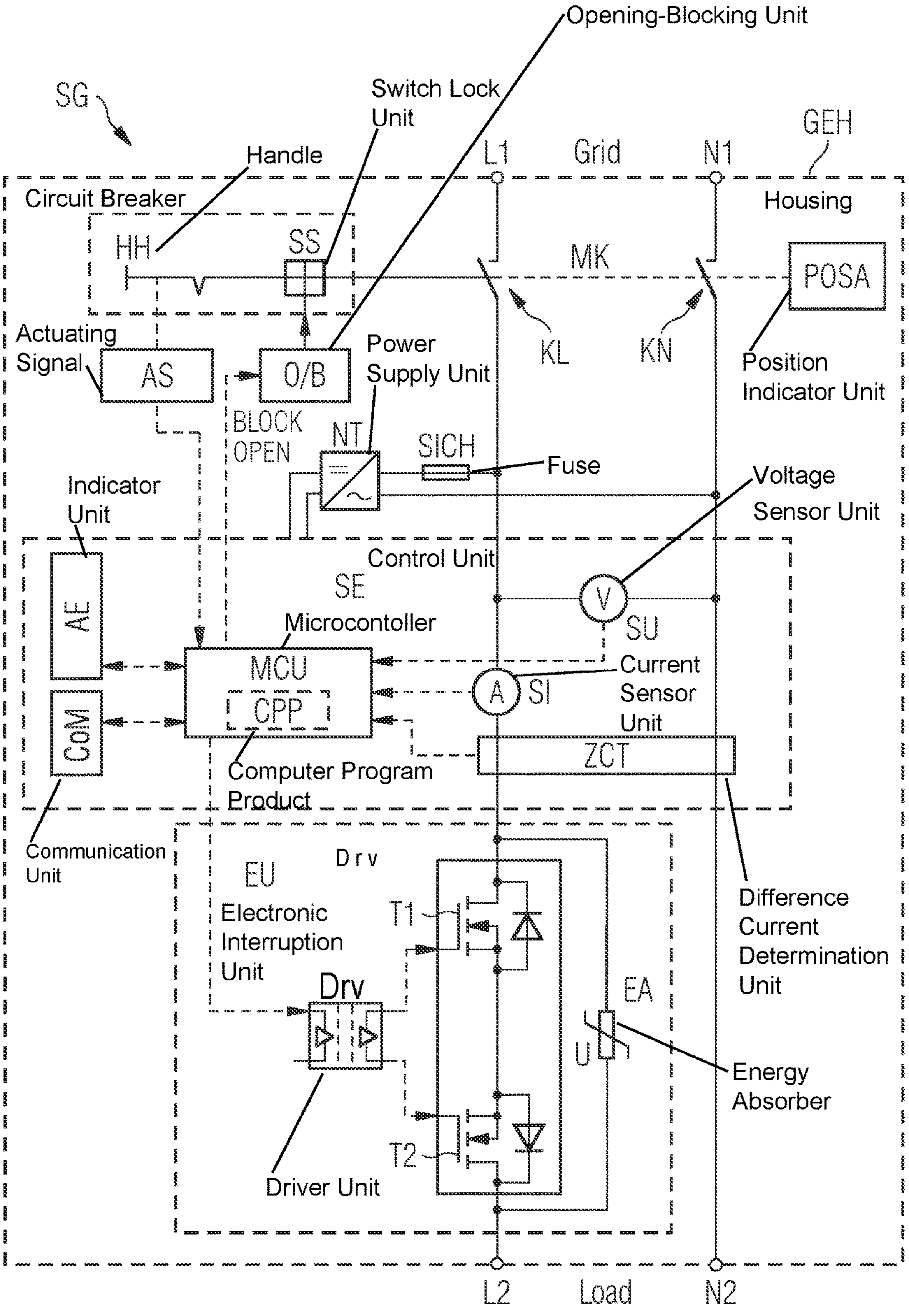
Opening-Blocking Unit
SG
Switch Lock Unit
Handle
L1
Grid
N1
GEH
Circuit Breaker
Housing
HH
SS
MK
POSA
Actuating Signal
AS
O/B
Power Supply Unit
KL
KN
Position Indicator Unit
BLOCK
OPEN
NT
SICH
Fuse
Voltage Sensor Unit
Indicator Unit
Control Unit
SE
V
SU
AE
Microcontoller
MCU
CPP
A
SI
Current Sensor Unit
CoM
ZCT
Computer Program Product
Communication Unit
Drv
EU
Electronic Interruption Unit
T1
Drv
EA
U
Energy Absorber
Difference Current Determination Unit
T2
Driver Unit
L2
Load
N2

CIRCUIT BREAKER

FIELD AND BACKGROUND OF THE INVENTION

The invention relates to the technical field of a circuit breaker for a low-voltage circuit having an electronic interruption unit.

The term 'low voltage' refers to voltages of up to 1,000 volts AC or up to 1,500 volts DC. Low voltage refers in particular to voltages that are greater than extra-low voltage, with values of 50 V AC or 60 V DC.

The terms low-voltage circuit, or grid or system, refer to circuits with nominal currents or rated currents of up to 125 Ampere, more specifically up to 63 Ampere. A low-voltage circuit refers in particular to circuits with nominal currents or rated currents of up to 50 Ampere, 40 Ampere, 32 Ampere, 25 Ampere, 16 Ampere or 10 Ampere. The current values given refer in particular to nominal, rated and/or cut-off currents, i.e. the maximum current that is normally passed through the circuit or at which the electric circuit is normally disconnected, for example by a protective device such as a circuit breaker, in-line circuit breaker or power circuit breaker. The rated currents can be further graduated from 0.5 A through 1 A, 2 A, 3 A, 4 A, 5 A, 6 A, 7 A, 8 A, 9 A, 10 A, etc. up to 16 A.

In-line circuit breakers are long-known overcurrent protection devices that are used in electrical installation technology in low-voltage electric circuits. These protect cables from damage caused by heating due to excessive current and/or short circuits. An in-line circuit breaker can switch off the circuit automatically in the event of overload and/or short circuit. An in-line circuit breaker is a non-automatically resetting fuse element. In contrast to in-line circuit breakers, power circuit breakers are designed for currents greater than 125 A, in some cases even as low as 63 Ampere. For this reason, miniature circuit breakers are simpler and more delicate in structure. Miniature circuit breakers usually have a mounting facility for mounting on a so-called top-hat rail (carrier rail, DIN rail, TH35).

In-line circuit breakers are electromechanical in design. In a housing, they have a mechanical switching contact or working current trip unit to interrupt (trip) the electrical current. Usually, a bimetallic protective element or bimetallic element is used for tripping (interruption) in the event of prolonged overcurrent (overcurrent protection) or thermal overload (overload protection). An electromagnetic trip unit with a coil is used for rapid tripping if an overcurrent limit value is exceeded or in the event of a short circuit (short-circuit protection). One or more arc quenching chamber(s) or devices for arc quenching are provided, in addition to connecting elements for conductors of the electric circuit to be protected.

Circuit breakers with an electronic interruption unit are relatively new developments. These have a semiconductor-based electronic interruption unit. In other words, the electrical current flow of the low-voltage circuit is conducted via semiconductor devices or semiconductor switches, which interrupt the electrical current flow or can be switched to a conductive state. Circuit breakers having an electronic interruption unit also frequently have a mechanical isolating system, in particular with isolator switch properties conforming to relevant standards for low-voltage circuits, the contacts of the mechanical isolating contact system being connected in series with the electronic interruption unit, i.e., the current of the low-voltage circuit to be protected is conducted via both the mechanical isolating contact system and the electronic interruption unit.

SUMMARY OF THE INVENTION

The object of the present invention is to improve a circuit breaker of the type mentioned above, in particular to specify a new, improved architecture for such a circuit breaker or to specify a design with increased safety for a circuit breaker or the low-voltage circuit to be protected.

This object is achieved by a circuit breaker having the features described below.

According to the invention, a circuit breaker for protecting an electric low-voltage circuit, in particular low-voltage AC voltage circuit, is proposed, comprising:

- a housing with grid-side and load-side terminals for conductors of the low-voltage AC circuit, in particular a grid-side phase conductor terminal, a grid-side neutral conductor terminal, a load-side phase conductor terminal, a load-side neutral conductor terminal,
- a mechanical isolating contact unit (MK) connected to the grid-side terminals, which is also connected to an electronic interruption unit (EU) that is also connected to the load-side terminals (L2, N2), so that a current flow in the low-voltage circuit is enabled by closed contacts of the isolating contact unit and a low-resistance state of semiconductor-based switching elements of the electronic interruption unit, or a galvanic isolation preventing current flow in the low-voltage circuit is enabled by open contacts of the isolating contact unit or/and a current flow in the low-voltage circuit is able to be prevented by a high-resistance state of the switching elements, i.e., a series circuit consisting of a mechanical isolating contact unit and an electronic interruption unit, wherein the mechanical isolating contact unit is arranged on the grid side and the electronic interruption unit is arranged on the load side,

- that the mechanical isolating contact unit has a handle for opening and closing the contacts,
- a current sensor unit arranged in a conductor between the isolating contact unit and the interruption unit, to determine the level of the current in the low-voltage circuit,
- a control unit, which is connected to the current sensor unit, the electronic interruption unit and the mechanical isolating contact unit, wherein the circuit breaker is designed in such a way that if current limits and/or current-time limits are exceeded, prevention of a current flow in the low-voltage circuit is initiated,

- a power supply unit for supplying power to the circuit breaker, which is connected to conductors of the low-voltage circuit between the isolating contact unit and the interruption unit.

According to the invention, a circuit breaker is proposed, wherein the electronic interruption unit is assigned to the load-side terminals (consumer, energy sink) and the mechanical isolating contact unit is assigned to the grid-side terminals (energy source). The power supply unit is connected to the conductors of the low-voltage circuit between the mechanical isolating contact unit and the electronic interruption unit. This means that the power supply to the circuit breaker, in particular to the control unit, is provided only when the contacts of the mechanical isolating contact unit are closed.

Advantageous embodiments of the invention are specified in the dependent claims and the exemplary embodiment.

In an advantageous embodiment of the invention, a voltage sensor unit connected to the control unit is provided. The voltage sensor unit is designed to determine the level of the voltage between the conductors of the low-voltage circuit, the voltage sensor unit being connected to the conductors between the isolating contact unit and the interruption unit.

This has the particular advantage that the voltage of the low-voltage circuit can be monitored and, if necessary, the circuit can be isolated in the event of overvoltages or undervoltages. Thus, the architecture according to the invention supports an increased operational safety of the circuit breaker or in the circuit.

In an advantageous embodiment of the invention, the mechanical isolating contact unit has a position indicator unit. The position indicator unit indicates the position of the contacts, i.e. the contact position (open, closed) is signaled. For example, the position indicator unit is a mechanical position indicator unit.

This has the particular advantage that information about the contact position (open, closed) is available. Furthermore, in the case of a mechanical position indicator unit, this information can also be/is indicated in the de-energized state.

In an advantageous embodiment of the invention, the circuit breaker has an indicator unit connected to the control unit.

This has the particular advantage that (status) information about the circuit breaker can be indicated, e.g. relating to switching and/or fault states.

In an advantageous embodiment of the invention, the circuit breaker has a communication unit connected to the control unit, which in particular enables a wireless communication capability.

This has the particular advantage that (status) information, such as switching and fault states, can be transmitted to another circuit breaker or monitoring and/or management system. In an advantageous embodiment of the invention, a difference current determination unit connected to the control unit is provided for determining a difference current in the conductors of the low-voltage circuit. This has the particular advantage that the circuit breaker also has fault current monitoring (difference current monitoring) and thus has additional functionality.

In an advantageous embodiment of the invention, the circuit breaker is designed in such a way that, when the mechanical isolating contact unit is actuated by the handle, a signal is sent to the control unit before the contacts are opened, so that said control unit places the semiconductor-based switching elements of the electronic interruption unit in a high-resistance state.

This has the particular advantage of supporting a de-energized (powerless) switching of the mechanical isolating contact unit, in particular that arcing or contact burnout is avoided.

In an advantageous embodiment of the invention, the mechanical isolating contact unit is designed in such a way that after a single application of a blocking signal, in particular by the control unit, the closing of the contacts by the handle is prevented. This means that the mechanical isolating contact unit has a blocking function or a blocking state, which in particular can be triggered once.

This has the particular advantage that, after a (in particular permanent) fault, in particular in the control unit, of the circuit breaker, which specifically endangers the operability of the circuit breaker, a supply of power to the circuit breaker and to the low-voltage circuit to be protected is prevented. This increases the safety of the low-voltage circuit, since an unprotected consumer is not supplied with power. In an advantageous embodiment of the invention, the mechanical isolating contact unit is designed in such a way that the contacts can be opened by the control unit, but cannot be closed. Specifically, the contacts can be opened even if the handle is blocked.

This has the particular advantage that increased operational safety is achieved, as the contact or contacts cannot be accidentally closed by the control unit. By opening the contacts even if the handle is blocked, a so-called free tripping is achieved, i.e. the low-voltage circuit is reliably protected even if the handle is blocked.

In an advantageous embodiment of the invention, a protective element, in particular a fuse, or/and a switch is connected upstream of the power supply unit.

This has the particular advantage that the power supply or control unit can be switched off, e.g. for insulation measurements. In addition, the power supply unit or the control unit can be fuse-protected in order to achieve increased safety of the circuit breaker against further faults.

In an advantageous embodiment of the invention, the circuit breaker is designed in such a way that the contacts of the mechanical isolating contact unit are closed by means of the handle during a power-on operation, wherein the switching elements of the electronic interruption unit are in a high-resistance state. On closure of the contacts, power is supplied to the power supply unit, which causes power to be supplied to the control unit. The control unit performs a checking function of the circuit breaker. If the result of the checking function is positive, the switching elements of the electronic interruption unit are placed in a low-resistance state so that the load-side terminals are supplied with power. The power-on operation is thereby completed.

This has the particular advantage that only a circuit breaker with positively completed checking functions, i.e. without faults, is switched on, or the load-side conductors are supplied with power so that a load or consumer or the load-side circuit is securely protected.

In an advantageous embodiment of the invention, the checking function comprises a self-test of the operability of the circuit breaker. During the self-test of the operability of the circuit breaker, the following is performed:

at least one component, in particular a plurality of components, of a unit, in particular of a plurality of units, of the circuit breaker is checked.

If the at least one component, in particular the plurality of components, of a unit, in particular a plurality of units, is operational, the low-resistance state is permitted.

This has the particular advantage that only a circuit breaker with functioning units is switched on, or monitors the circuit, so that the safety in the low-voltage circuit is guaranteed.

In an advantageous embodiment of the invention, the contacts of the mechanical isolating contact unit are opened in the absence of operability. In particular, in advance or in parallel, a blocking signal prevents the contacts from being closed again.

This has the particular advantage that a defective circuit breaker, which can no longer perform its monitoring functions, prevents (accidental) supply of power to a load or the load-side conductors, so that unprotected circuits are avoided, thereby increasing safety.

In an advantageous embodiment of the invention, the checking function comprises checking at least one electrical parameter of the load-side or grid-side terminal. In particular, the checking function performs a check of at least one, in particular a plurality or all of the following parameters:

checking for overshoot of a first overvoltage value or/and a second overvoltage value or/and a third overvoltage value, in particular on the grid side, checking for undershoot of a first undervoltage value, in particular on the grid side, checking for overshoot of a first temperature limit value or/and a second temperature limit value or/and a third temperature limit value, checking for parameters of the load-side terminal, in particular for undershoot of a load-side first or/and second resistance value or load-side first or/and second impedance value.

The term overvoltage or overvoltage value as used here means that the valid operating voltage is exceeded. It does not mean the levels of overvoltage dips, for example as occur during so-called bursts or surges, which can typically have values of 4 kV or 8 kV (for a 230 volt or 400 volt grid), so-called grid overvoltages (i.e., for example, ten times the nominal voltage of the low voltage circuit).

In particular, the first overvoltage value may be a certain percentage higher than the nominal voltage value. For example, for a nominal voltage value of 230 volts, 10% higher, 230V+10%.

In particular, the second overvoltage value may be a certain percentage higher than the nominal voltage value. For example, for a nominal voltage value of 230 volts, 20% higher, 230V+20%.

In particular, the third overvoltage value may be a further certain percentage higher than the nominal voltage value. For example, for a nominal voltage value of 230 volts, 30% higher, 230V+30%.

This has the particular advantage that, for example, a circuit breaker is not switched on to a grid with a non-standard nominal voltage (operating voltage) or on to a load with invalid parameters. Thus, for example, a lack of protection in the event of a faulty connection of, for example, a 230 volt circuit breaker on, for example, the two phases with a voltage of 400 volts can be detected and prevented, and an incorrect supply of a load with an excessively high voltage can be prevented. Likewise, a potential destruction of the circuit breaker associated with these events can be avoided. In a similar manner, powering on to a short circuit can be detected and prevented before the full supply voltage is applied. Similarly, if the voltages are too low (a 230 volt device in the 115 volt grid), problems and lack of protection can be avoided. This ensures increased operational safety in the low-voltage circuit.

Furthermore, this has the particular advantage that not only is the circuit breaker itself checked, but also the circuit/conductors connected to the circuit breaker, i.e. in particular the power source or the energy sink/consumer. This represents a new functionality for a circuit breaker. This means that faults on the grid side can be detected and avoided, e.g. due to connecting the circuit breaker to the wrong conductors (400 volts instead of 230 volts). Likewise, potential faults on the load side, e.g. smooth short circuits, can also be detected in good time and powering on to the short circuit can be avoided.

In an advantageous embodiment of the invention, depending on the parameters tested:

if the first overvoltage value is exceeded, overvoltage information is issued, if the second overvoltage value is exceeded, the electronic interruption unit is prevented from being set to low resistance, if the third overvoltage value is exceeded, the contacts are opened, if the first undervoltage value is undershot, undervoltage information is issued or/and the electronic interruption unit remains at high resistance, in particular if the voltage level is greater than a second undervoltage value, if the first temperature limit value is exceeded, temperature information is issued, if the second temperature limit value is exceeded, the electronic interruption unit remains at high resistance, if the third temperature limit value is exceeded, the contacts are opened, if the load-side first resistance value or load-side first impedance value is undershot, impedance information is issued, if the load-side second resistance value or the load-side second impedance value is undershot, the electronic interruption unit remains at high resistance.

This has the particular advantage that defined measures—Warning—Remain high-resistance—Galvanic isolation—are carried out in stages, depending on the overshoot or undershoot of certain defined parameters. This achieves a staged protection concept and increased operational safety in the low-voltage circuit.

In an advantageous embodiment of the invention, the circuit breaker is designed in such a way that, when the handle is actuated to open the contacts, a signal is sent to the control unit before the contacts are opened, so that the switching elements of the electronic interruption unit are placed in a high-resistance state. In addition, that the control unit stores at least one current value or current-time value of the current flow in the low-voltage circuit in a grid voltage-independent memory. This has the particular advantage of supporting a de-energized (power-less) switching of the mechanical isolating contact unit, in particular that arcing or contact burnout is avoided. In addition, the level of the current is detected before, for example, the initiated opening and can be read out afterwards. This assists in determining the cause of the fault.

In an advantageous embodiment of the invention, the circuit breaker is designed in such a way that if a current limit value or/and current-time limit value is exceeded, the switching elements of the electronic interruption unit are placed in a high-resistance state to prevent a current flow in the low-voltage circuit. Depending on the adjustable configuration of the circuit breaker, in addition:

the contacts of the mechanical isolating contact unit are opened or the switching elements remain in a high-resistance state and this state is indicated. In particular, setting of the switching elements to low resistance can be initiated by an input. Or that the switching elements are set to low resistance after a first period of time or after a test of the load-side terminal, in particular a test of at least one electrical parameter of the load-side terminal, more specifically that a threshold value of the electrical parameter has been undershot or exceeded.

This has the particular advantage that the behavior of the circuit breaker is configurable. In particular, different measures can be configured to prevent current flow depending on the particular application. It is also possible to configure the circuit to be switched on again. This increases the range of application and functionality by using a circuit breaker.

In an advantageous embodiment of the invention, the circuit breaker is designed in such a way that if a fault is detected in a unit of the circuit breaker, the switching elements of the electronic interruption unit are placed in a high-resistance state to prevent a current flow in the low-voltage circuit, and that also, the contacts of the mechanical isolating contact unit are opened and the mechanical isolating contact unit is placed in a blocked state (beforehand) by means of a blocking signal (from the control unit), so that the contacts are prevented from being closed again.

This has the particular advantage that a circuit breaker detects faults itself and automatically establishes a safe state in the low-voltage circuit when a fault is detected, in particular as a permanent fault.

In an advantageous embodiment of the invention, the circuit breaker is designed in such a way that in the event of a power failure of the electric low-voltage circuit, the mechanical isolating contact unit remains in its switching state, so that in the event of a power failure after the contacts have been closed, the contacts remain closed after the power supply has been restored.

This has the particular advantage that after a power failure, the circuit breaker does not need to be (manually) switched on again, thus ensuring that the power supply is restored.

In an advantageous embodiment of the invention, the control unit comprises a microcontroller.

This has the particular advantage that the functions according to the invention for increasing the safety of a circuit breaker, or the electric low-voltage circuit to be protected, can be implemented by an (adaptable) computer program product. Furthermore, changes and improvements to the function can be individually loaded onto a circuit breaker, for example also via the communication unit.

According to the invention, a corresponding method for a circuit breaker for a low-voltage circuit with electronic (semiconductor-based) switching elements having the same and further advantages is claimed.

A method for operating a circuit breaker according to any of the specific patent claims is claimed.

The method is directed, for example, toward the operation of a circuit breaker with a series circuit consisting of a mechanical isolating contact unit and an electronic interruption unit, wherein the mechanical isolating contact unit is arranged on the grid side and the electronic interruption unit is arranged on the load side (in the circuit breaker). The mechanical isolating contact unit has a handle for opening and closing the contacts. A current flow in the low-voltage circuit can be enabled by closed contacts of the isolating contact unit and a low-resistance state of semiconductor-based switching elements of the electronic interruption unit, OR a galvanic isolation preventing current flow in the low-voltage circuit can be enabled by open contacts of the isolating contact unit or/and a current flow in the low-voltage circuit is able to be prevented by a high-resistance state of the switching elements. The level of the current in the low-voltage circuit is determined (in the circuit breaker) and, if current limit values and/or current-time limit values are exceeded, prevention of a current flow in the low-voltage circuit is initiated (by means of the mechanical isolating contact unit or/and the electronic interruption unit).

A power supply unit for supplying power to the circuit breaker is provided, which is connected to conductors of the low-voltage circuit between the isolating contact unit and the interruption unit (in the circuit breaker). The contacts of the mechanical isolating contact unit are closed by means of the handle during a power-on operation, wherein switching elements of the electronic interruption unit are in a high-resistance state. On closure of the contacts, power is supplied to the power supply unit (which allows power to be supplied to a control unit). The power supply is used to perform a checking function of the circuit breaker (for example, by the control unit). If the result of the checking function is positive, the electronic interruption unit is placed in a low-resistance state so that load-side terminals of the circuit breaker are supplied with power. (Assuming that electrical power is available at the grid-side terminals.)

Further methods (embodiments) can be derived from the specific embodiments, patent claims and the exemplary embodiment.

All embodiments, whether in dependent form referred back to the independent patent claim 1 or referred back only to individual features or combinations of features of patent claims, bring about an improvement of a circuit breaker, in particular a new architecture and improved safety of a circuit breaker or the electrical circuit, and represent a new design for a circuit breaker.

The described properties, features and advantages of the present invention and the manner in which they are achieved will become clearer and more comprehensible in conjunction with the following description of the exemplary embodiments, which are explained in more detail in connection with the drawings.

BRIEF DESCRIPTION OF THE FIGURE

The FIGURE shows a block circuit diagram of a circuit breaker.

DETAILED DESCRIPTION OF THE INVENTION

The FIGURE shows a representation of a circuit breaker SG for the protection of an electric low-voltage circuit, in particular a low-voltage alternating current circuit, comprising:

a housing GEH with grid-side L1, N1 and load-side L2, N2 terminals for conductors of the low-voltage AC circuit, the grid-side terminals comprise a grid-side neutral conductor terminal N1 and a grid-side phase conductor terminal L1, the load-side terminals comprise a load-side neutral conductor terminal N2 and a load-side phase conductor terminal L2, a power source, for example, is connected to the grid-side terminals or the grid side Grid, (at least) one consumer or load is connected to the load-side terminals or the load side Load, a mechanical isolating contact unit MK connected to the grid-side L1, N1 terminals, which is also connected to an electronic interruption unit EU that is also connected to the load-side terminals L2, N2, i.e., a series circuit comprising a mechanical isolating contact unit MK and an electronic interruption unit EU, wherein the mechanical isolating contact unit MK is assigned to the grid-side terminals L1, N1 or the grid side Grid and the electronic interruption unit EU is assigned to the load-side terminals L2, N2 or the load side Load, so that a current flow in the low-voltage circuit is enabled by closed contacts KL, KN of the isolating contact unit MK and a low-resistance state of semiconductor-based switching elements T1, T2 of the electronic interruption unit EU, or a galvanic isolation preventing a current flow in the low-voltage circuit is enabled by open contacts KL, KN of the isolating contact unit MK or/and a current flow in the low-voltage circuit is able to be prevented by a high-resistance state of the switching elements T1, T2 of the electronic interruption unit EU, the mechanical isolating contact unit MK has a handle for closing and opening the contacts KL, KN, which is accessible on the outside of the housing so that it can be operated manually by an operator, a current sensor unit SI, arranged in a conductor between the isolating contact unit MK and the interruption unit EU, to determine the level of the current in the low-voltage circuit, in the example, the current sensor unit SI is arranged in the phase conductor, a control unit SE, which is connected to the current sensor unit SI, the electronic interruption unit EU and the mechanical isolating contact unit MK, wherein the circuit breaker SG is designed in such a way, that if current limit values and/or current time limit values are exceeded, a prevention of current flow in the low-voltage circuit is initiated, this can be carried out by setting the switching elements T1, T2 of the electronic interruption unit EU to high resistance or/and by opening the contacts KL, KN of the mechanical isolating contact unit MK, a power supply unit NT for supplying power to the circuit breaker SG, in particular the control unit SE, which is connected to conductors of the low-voltage circuit between the isolating contact unit MK and the interruption unit EU, so that the power supply is supplied with energy when the contacts KL, KN of the isolating contact unit MK are closed (provided a power source is connected to the grid side Grid, i.e. to the grid-side terminals L1, N2).

A protective element, in particular a fuse SICH (as shown in the FIGURE), or/and a switch can be connected upstream of the power supply unit.

The circuit breaker SG in the example further comprises a voltage sensor unit SU connected to the control unit SE for determining the level of the voltage between the conductors of the low-voltage circuit between the isolating contact unit MK and the interruption unit EU.

In the example, the circuit breaker SG has a difference current determination unit ZCT connected to the control unit, which is arranged on the conductors of the low-voltage circuit between the isolating contact unit MK and the interruption unit EU, for determining a difference current between the conductors of the low-voltage circuit.

In the example, the circuit breaker SG has an indicator unit AE connected to the control unit SE, for indicating status information of the circuit breaker, in particular the control unit SE.

In the example, the circuit breaker SG has a communication unit COM connected to the control unit SE. This can enable wired or wireless communication, as well as both of these.

The control unit SE has a microcontroller MCU for controlling the circuit breaker. The microcontroller MCU or the control unit SE may have a computer program product CPP. The computer program product CPP comprises commands which, when the program is executed by the microcontroller MCU, cause the latter to initiate the aforementioned functions for a circuit breaker.

A computer-readable storage medium, on which the computer program product CPP is stored, may be provided.

Likewise, a data carrier signal that transmits the computer program product CPP may be provided. Thus, the computer program product CPP or a new computer program product CPP can reach the circuit breaker by means of the communication unit COM.

In the example according to the FIGURE, the control unit SE comprises the microcontroller MCU containing computer program product CPP, the indicator unit AE, the communication unit CPP, the current sensor unit SI, the voltage sensor unit SU and the difference current determination unit ZCT. This is only one example, the units can also be separate or grouped differently.

The electronic interruption unit EU in the example according to the FIGURE has two semiconductor-based switching elements T1, T2, such as transistors, field effect transistors, IGBTs, etc. The semiconductor-based switching elements T1, T2 can be controlled by a driver unit Drv. In the example, the driver unit Drv is in turn controlled by the control unit SE. The electronic interruption unit EU can have an energy absorber EA, to prevent destructive voltage peaks or the absorption of switching energies.

In the example, the electronic interruption unit EU is designed in single-pole form (for one conductor of the low-voltage circuit). In the example, the electronic interruption unit EU is arranged in the phase conductor.

In the example, the mechanical isolating contact unit MK is designed in two-pole form (in both conductors, of the single-phase AC circuit in the example). With a two-pole design, safe galvanic isolation is possible provided that the mechanical isolation contact unit MK is designed with isolator switch properties in accordance with the standard (distances, minimum air gaps, etc.).

The mechanical isolating contact unit MK has a position indicator unit POSA, which indicates the (switch) position of the contacts of the mechanical isolating contact unit MK.

The position indicator unit has a mechanical design, so that the contact position can be indicated even in the de-energized state (no power from the grid side Grid).

The circuit breaker or the mechanical isolating contact unit MK is designed in such a way that, when the mechanical isolating contact unit MK is actuated by the handle HH, an (actuating) signal AS is sent to the control unit SE before the contacts KL, KN are opened. The circuit breaker SG or the control unit SE is designed in such way that the semiconductor-based switching elements T1, T2 of the electronic interruption unit EU are then placed in a high-resistance state, thus enabling powerless switching with the mechanical isolating contact unit MK.

The circuit breaker or mechanical isolating contact unit MK is designed in one embodiment in such a way that after a single application of a blocking signal BLOCK, in particular by the control unit SE, a (further) closing of the contacts KL, KN by means of the handle is prevented. This means that after the (single) application of the blocking signal BLOCK it is no longer possible to close the contacts KL, KN by means of the handle HH at a later time. Removal of the blocking can be or may only be carried out by qualified personnel. 23

The circuit breaker or the mechanical isolating contact unit MK is designed in such a way that the contacts KL, KN can be opened by the control unit SE, for example by means of an opening signal OPEN, but cannot be closed. In particular, the contacts can be opened even if the handle is blocked (for example, contrary to normal use, the contacts are permanently actuated to "On"/closed).

Additional units may be provided, such as a switch lock unit SS or a combined opening-blocking unit O/B.

The novel circuit breaker SG according to the invention is designed in such a way that the contacts of the mechanical isolating contact unit are closed by means of the handle during a power-on operation, wherein the switching elements of the electronic interruption unit are in a high-resistance state. This means that the electronic interruption unit is high-resistance when the power supply is de-energized. On closure of the contacts, power is supplied to the power supply unit (provided the grid side Grid is supplied with power by a power source). This supplies power to the control unit. The control unit SE performs a checking function of the circuit breaker. If the result of the checking function is positive (i.e. no faults are detected), the switching elements T1, T2 of the electronic interruption unit EU are placed in a low-resistance state so that the load-side terminals are supplied with power from the low-voltage circuit. The power-on operation is thus completed. The device is safe, or establishes a safe state in the low-voltage circuit, as only operational circuit breakers (checking function) supply the circuit with power.

The checking function can be realized by the control unit, specifically the microcontroller MCU in cooperation with the computer program product CPP.

The checking function can comprise, on the one hand, a self-test of the operability of the circuit breaker (internal). In this case at least one component, in particular a plurality of components, of a unit, in particular of a plurality of units, of the circuit breaker can be checked.

If the at least one component, in particular the plurality of components, of a unit, in particular a plurality of units, is operational, the low-resistance state is permitted.

In the absence of operability, the contacts of the mechanical isolating contact unit are opened. If no operability is found after a new power-on operation (or a certain number of additional ones, e.g. 0 to 3), a blocking signal can be issued in advance of or in parallel with the opening signal, so that a new (further) closing of the contacts is prevented.

The checking function can on the other hand comprise checking at least one electrical parameter of the load-side or grid-side terminal (external).

For example, that the checking function performs a check of at least one, in particular a plurality or all of the following parameters:

- checking for overshoot of a first overvoltage value or/and a second overvoltage value or/and a third overvoltage value, in particular on the grid side,
- checking for undershoot of a first undervoltage value, in particular on the grid side,
- checking for overshoot of a first temperature limit value or/and a second temperature limit value or/and a third temperature limit value,
- checking for parameters of the load-side terminal, in particular for undershoot of a load-side first and/or second resistance value or load-side first and/or second impedance value.

Depending on the parameters checked, the following can be carried out:

- if the first overvoltage value is exceeded, overvoltage information is issued,
- if the second overvoltage value is exceeded, the electronic interruption unit is prevented from being set to low resistance,
- if the third overvoltage value is exceeded, the contacts are opened,
- if the first undervoltage value is undershot, undervoltage information is issued or/and the electronic interruption unit remains at high resistance, in particular provided the voltage level is greater than a second undervoltage value,
- if the first temperature limit value is exceeded, temperature information is issued, if the second temperature limit value is exceeded, the electronic interruption unit remains at high resistance,
- if the third temperature limit value is exceeded, the contacts are opened,
- if the load-side first resistance value or the load-side first impedance value is undershot, impedance information is issued,
- if the load-side second resistance value or the load-side second impedance value is undershot, the electronic interruption unit remains at high resistance.

The circuit breaker can be designed in such a way that, when the handle HH is actuated to open the contacts, a signal is sent to the control unit SE before the contacts are opened, so that the switching elements of the electronic interruption unit EU are placed in a high-resistance state, or/and that the control unit SE stores at least one current value or current-time value of the current flow in the low-voltage circuit in a grid voltage-independent memory, in particular of the control unit SE.

The circuit breaker can be designed in such a way that if a current limit value or/and current-time limit value is exceeded, the switching elements of the electronic interruption unit (EU) are placed in a high-resistance state to prevent a current flow in the low-voltage circuit, such that, depending on the adjustable configuration of the circuit breaker, in addition:

- the contacts of the mechanical isolating contact unit (MK) are opened or
- the switching elements remain in a high-resistance state and this state is indicated, in particular that setting of the switching elements to low resistance can be initiated by an input, or
- that the switching elements are set to low resistance after a first period of time or after a test of the load-side terminal, in particular a test of at least one electrical parameter of the load-side terminal, more specifically that a threshold value of the electrical parameter has been undershot or exceeded.

The circuit breaker may be designed in such a way that, in the event of a fault being detected in a unit of the circuit breaker (during operation), in particular by the control unit SE, the switching elements of the electronic interruption unit are placed in a high-resistance state to prevent a current flow in the low-voltage circuit. In addition, the contacts of the mechanical isolating contact unit can be opened. In addition, the mechanical isolating contact unit can be placed in a blocked state by a blocking signal, so that a renewed closing of the contacts is prevented—at least after one or more renewed power-on attempts.

The circuit breaker can be designed in such a way that in the event of a power failure of the electric low-voltage circuit, the mechanical isolating contact unit remains in its switching state, so that in the event of a power failure after the contacts have been closed, the contacts remain closed after the power supply has been restored. High resistance refers to a state in which only a current of negligible size can flow. In particular, high resistance means resistance values of greater than 1 kilohm, preferably greater than 10 kilohms, 100 kilohms, 1 Megohm, 10 Megohms, 100 Megohms, 1 Gigohm or greater.

Low resistance refers to a state in which the current value specified on the circuit breaker could flow.

In particular, low resistance means resistance values that are less than 10 ohms, preferably less than 1 ohm, 100 milliohms, 10 milliohms, 1 milliohms or less.

In the following, the invention will be described or summarized again, but worded differently.

In electronic circuit breakers according to the invention, mechanical switching contacts in combination with an electronic switch will perform the switching functions.

1.) New Concept:

Mechanical isolation contacts in both conductors/poles

One pole (L) is protected by power semiconductors

Relief network (energy absorber) across the switch

A mechanical actuation of the mechanical contacts, which is structured in such a way that the actuation is sent to the control unit before the contacts are opened, and this causes the electronic interruption unit/power semiconductor to become high-resistance/safely switches it off The mechanical isolating contact unit can be opened by the control unit, but cannot be closed The mechanical isolating contact unit can only be closed manually by means of the handle Measurement technology:

Voltage measurement between L and N

Current measurement in the protected pole (L)

Total current measurement through L and N

The power supply for the control unit taps off the voltage on L and N behind the mechanical isolating contact unit.

The power supply has a protected terminal at L (e.g. fuse)

The control unit can place the mechanical isolating contact unit in a "blocked" state (e.g. "continuous slipping"). A manual/mechanical power-on via the handle is then no longer possible. (Protection against a fault case in the control unit/circuit breaker)

The device has a communication unit (preferably wireless)

The contact position of the contacts is indicated mechanically.

(e.g. with Green: Off and Red: On)

The device has an indicator unit that shows the status of the device. E.g. using light emitting diodes/LEDs, as follows:

Red: On state

Green: Off state, disconnected from grid

Yellow: Control state, high-resistance

2.) Power-on Behavior:

When the device is switched on, it is switched on using the handle.

a) The handle is set to ON b) Contacts close c) The load-side terminal is still de-energized because interruption unit is high resistance d) Power supply unit starts supplying power to the circuit breaker/control unit e) Checking function-internal: self-test (units)

f) Checking function-external: grid side Grid or (/and) load side Load (e.g. load is checked (e.g. for short circuit))

g) Interruption unit becomes low-resistance (without further (manual) actuation)

h) Load side is powered/receives power from grid side

3.) Power-Off Behavior:

When the device is powered off, the device is switched off via the handle (manual actuation).

a) Handle is set to OFF (to open contacts)

b) The actuation is sent to the control unit before the contacts open c) The interruption unit becomes high resistance immediately (or intelligently in the zero crossing)

d) The contacts open e) The control unit stores (in advance) an e.g. $I^2t$ value for the thermal memory f) The power supply to the control unit is interrupted g) The device switches off 4.) Behavior in the Event of a Fault in the Load: Short Circuit or Overload:

If a device experiences e.g. a short circuit in the load, the device reacts as follows.

a) Overshoot of a current limit value is detected by the relevant units b) The interruption unit is switched to the high-resistance state so that the load/consumer is no longer supplied with power/voltage c) The device can then decide, depending on the configuration (based on the type of fault and/or fault current), which of the following (two) states will be assumed:

I) The device automatically opens the mechanical contacts and the device is switched off completely (i.e. also disconnected from grid)

II) The device remains in the high-resistance state (the contact of the isolating contact unit remain closed—i.e. the device does not disconnect from grid). From this state, an automatic power-on is possible again.

5.) Behavior in the Case of (Internal) Device Fault:

If a fault occurs in the circuit breaker, in particular the control unit, the device goes into a safe state from which the device cannot be switched on again. The precondition is the detection of the defect by the circuit breaker.

a) The fault is detected in the circuit breaker.

b) The device switches the interruption unit to high resistance.

c) The device opens the contacts of the isolating contact unit and in so doing blocks the isolating contact unit (e.g. the switch lock) to the extent that it is no longer possible to close the contacts using the handle.

6.) Behavior in the Event of a Grid Failure:

If a grid failure occurs, the circuit breaker is no longer supplied with power. The contacts remain closed. This means that the device can change to the previous switching state without manual actuation when the grid voltage is restored.

Although the invention has been illustrated and described in greater detail by means of the exemplary embodiment, the invention is not restricted by the examples disclosed and other variations can be derived therefrom by the person skilled in the art without departing from the scope of protection of the invention.

The invention claimed is:

1. A circuit breaker for protecting an electric low-voltage AC circuit, the circuit breaker comprising:

a housing having grid-side and load-side terminals for conductors of the low-voltage circuit;

an electronic interruption unit connected to said load-side terminals, said electronic interruption unit having semiconductor-based switching elements;

a mechanical isolating contact unit connected to said grid-side terminals and connected to said electronic interruption unit, said mechanical isolating contact unit having contacts and a handle for opening and closing said contacts;

said contacts of said mechanical isolating contact unit being closed and said semiconductor-based switching elements of said electronic interruption unit having a low-resistance state, for enabling a current flow in the low-voltage circuit, or at least one of said contacts of said mechanical isolating contact unit being open, for enabling a galvanic isolation preventing current flow in the low-voltage circuit or said semiconductor-based switching elements having a high-resistance state, for preventing a current flow in the low-voltage circuit;

a current sensor unit disposed in a conductor downstream of said mechanical isolating contact unit, for determining a current level in the low-voltage circuit;

a control unit connected to said current sensor unit, to said electronic interruption unit and to said mechanical isolating contact unit, for initiating prevention of a current flow in the low-voltage circuit upon exceeding at least one of current limits or current-time limits; and a power supply unit for supplying power to the circuit breaker, said power supply unit connected to conductors of the low-voltage circuit between said mechanical isolating contact unit and said electronic interruption unit, wherein:

said contacts of said mechanical isolating contact unit being closed by said handle during a power-on operation, and said semiconductor-based switching elements of said electronic interruption being in a high-resistance state;

upon closure of said contacts, power being supplied to said power supply unit, causing power to be supplied to said control unit; and said control unit performing a checking function of the circuit breaker, and upon a positive result of said checking function, said semiconductor-based switching elements of said electronic interruption unit being placed in a low-resistance state causing said load-side terminals to be supplied with power from the low-voltage circuit.

2. The circuit breaker according to claim 1, which further comprises a voltage sensor unit connected to said control unit for determining a voltage level between the conductors of the low-voltage circuit between said mechanical isolating contact unit and said electronic interruption unit.

3. The circuit breaker according to claim 1, wherein said mechanical isolating contact unit has a position indicator unit or a mechanical position indicator unit indicating a position of said contacts.

4. The circuit breaker according to claim 1, which further comprises an indicator unit connected to said control unit for indicating a high-resistance or low-resistance switching state of said electronic interruption unit.

5. The circuit breaker according to claim 1, which further comprises a communication unit connected to said control unit for enabling a wireless communication capability.

6. The circuit breaker according to claim 1, which further comprises a difference current determination unit connected to said control unit for determining a difference current in the conductors of the low-voltage circuit.

7. The circuit breaker according to claim 1, wherein said handle actuates said mechanical isolating contact unit to send a signal to said control unit before said contacts are opened, causing said control unit to place said semiconductor-based switching elements of said electronic interruption unit in a high-resistance state.

8. The circuit breaker according to claim 1, wherein said mechanical isolating contact unit is configured to prevent closing of said contacts by said handle after a single application of a blocking signal by said control unit.

9. The circuit breaker according to claim 1, wherein said mechanical isolating contact unit is configured to permit said contacts to be opened by said control unit, but not closed, even when said handle is blocked.

10. The circuit breaker according to claim 1, which further comprises a protective element or a fuse connected upstream of said power supply unit.

11. The circuit breaker according to claim 1, wherein:

said checking function includes a self-test of operability of the circuit breaker, in which at least one or a plurality of components of a unit or a plurality of units of the circuit breaker is checked; and upon said at least one component or said plurality of components of said unit or said plurality of units being operational, the low-resistance state is permitted.

12. The circuit breaker according to claim 11, wherein upon an absence of operability, said contacts of said mechanical isolating contact unit are opened and in advance or in parallel, a blocking signal prevents said contacts from being closed again.

13. The circuit breaker according to claim 1, wherein:

said checking function includes a check of at least one electrical parameter of one of said load-side or grid-side terminals;

said checking function performs a check of at least one or a plurality or all following parameters:

checking for overshoot of at least one of a first overvoltage value or a second overvoltage value or a third overvoltage value on a grid side, or checking for an undershoot of a first undervoltage value on a grid side, or checking for an overshoot of at least one of a first temperature limit value or a second temperature limit value or a third temperature limit value, or checking for parameters of said load-side terminal for an undershoot of at least one of a load-side first or second resistance value or at least one of a load-side first or second impedance value.

14. The circuit breaker according to claim 13, wherein, depending on said parameters being checked:

when the first overvoltage value is exceeded, overvoltage information is issued, when the second overvoltage value is exceeded, said electronic interruption unit is prevented from being set to low resistance, when the third overvoltage value is exceeded, said contacts are opened, when the first undervoltage value is undershot, at least one of undervoltage information is issued or said electronic interruption unit remains at high resistance, when the voltage level is greater than a second undervoltage value, when the first temperature limit value is exceeded, temperature information is issued, when the second temperature limit value is exceeded, said electronic interruption unit remains at high resistance, when the third temperature limit value is exceeded, said contacts are opened, when the load-side first resistance value or the load-side first impedance value is undershot, impedance information is issued, and when the load-side second resistance value or the load-side second impedance value is undershot, said electronic interruption unit remains at high resistance.

15. The circuit breaker according to claim 1, wherein:

said handle actuates said mechanical isolating contact unit to send a signal to said control unit before said contacts are opened, causing said semiconductor-based switching elements of said electronic interruption unit to be placed in a high-resistance state; and said control unit stores at least one current value or current-time value of a current flow in the low-voltage circuit in a grid voltage-independent memory.

16. The circuit breaker according to claim 1, wherein:

upon exceeding at least one of a current limit value or a current-time limit value, said semiconductor-based switching elements of said electronic interruption unit are placed in a high-resistance state to prevent a current flow in the low-voltage circuit; and in addition, depending on an adjustable configuration of the circuit breaker:

said contacts of said mechanical isolating contact unit are opened, or said semiconductor-based switching elements remain in a high-resistance state indicating that setting of said semiconductor-based switching elements to low resistance can be initiated by an input, or said semiconductor-based switching elements are set to low resistance after a first period of time or after a test of at least one electrical parameter of said load-side terminals that a threshold value of said at least one electrical parameter has been undershot or exceeded.

17. The circuit breaker according to claim 1, wherein, upon a fault being detected in a unit of the circuit breaker:

said semiconductor-based switching elements of said electronic interruption unit are placed in a high-resistance state to prevent a current flow in the low-voltage circuit; and said contacts of said mechanical isolating contact unit are opened and said mechanical isolating contact unit is placed in a blocked state by a blocking signal, preventing said contacts from being closed again.

18. The circuit breaker according to claim 1, wherein in an event of a power failure of the electric low-voltage circuit, said mechanical isolating contact unit remains in its switching state, so that in an event of a power failure after said contacts have been closed, said contacts remain closed after a power supply has been restored.

19. The circuit breaker according to claim 1, wherein said control unit has a microcontroller.

20. A method for operating a circuit breaker, the method comprising:

providing a circuit breaker having a series circuit of a mechanical isolating contact unit and an electronic interruption unit, the mechanical isolating contact unit being disposed on a grid side, the electronic interruption unit being disposed on a load side, the mechanical isolating contact unit having contacts and a handle for opening and closing the contacts, and the electronic interruption unit having switching elements;

determining a current level in the low-voltage circuit and, upon exceeding at least one of current limits or current-time limits, initiating prevention of a current flow in the low-voltage circuit;

connecting a power supply unit for supplying power to the circuit breaker to conductors of the low-voltage circuit between the mechanical isolating contact unit and the electronic interruption unit;

using the handle of the mechanical isolating contact unit to close the contacts during a power-on operation, and placing the switching elements in a high-resistance state;

upon closure of the contacts, supplying power to the power supply unit, causing a checking function of the circuit breaker to be performed; and upon a positive result of the checking function, placing the electronic interruption unit in a low-resistance state for supplying load-side terminals of the circuit breaker with power.

* * * * *